(12) United States Patent
Tateishi (10) Patent No.: US 7,910,007 B2
(45) Date of Patent: Mar. 22, 2011

(54) TREATMENT METHOD OF WASTE LIQUID AND TREATMENT APPARATUS

(75) Inventor: Fuminori Tateishi, Kanagawa (JP)

(73) Assignee: Semiconductor Energy laboratory Co., Ltd. (JP)

( * ) Notice: Subject to any disclaimer, the term of this patent is extended or adjusted under 35 U.S.C. 154(b) by 1187 days.

(21) Appl. No.: 11/523,461

(22) Filed: Sep. 19, 2006

(65) Prior Publication Data

US 2007/0068877 A1    Mar. 29, 2007

(30) Foreign Application Priority Data

Sep. 28, 2005   (JP) ................................ 2005-281869

(51) Int. Cl.
   *C02F 1/00*    (2006.01)
(52) U.S. Cl. ......................................... 210/742; 210/175
(58) Field of Classification Search ...................... 210/86, 210/97, 104, 761, 762, 904, 748.01, 742, 210/175
See application file for complete search history.

(56) References Cited

U.S. PATENT DOCUMENTS 5,158,689 A * 10/1992 Ishii et al. ..................... 210/762

FOREIGN PATENT DOCUMENTS

| JP | 6-132272 | 5/1994 |
|----|----------|--------|
| JP | 7-078799 | 3/1995 |
| JP | 2000-088148 | 3/2000 |
| JP | 2003-229356 | 8/2003 |

* cited by examiner

*Primary Examiner* — Walter D Griffin
*Assistant Examiner* — Cameron J Allen
(74) *Attorney, Agent, or Firm* — Husch Blackwell LLP (57) ABSTRACT

It is an object of the present invention, in performing cooling treatment of a waste liquid, to provide a mechanism which safely treats the waste liquid by cooling, without increasing cost and without providing large equipment. A treatment method of a waste liquid is proposed, in which a chemical liquid is supplied from a chemical liquid supply portion to a chemical liquid treatment portion; water is supplied from a water supply portion to a water treatment portion; a first waste liquid discharged from the chemical liquid treatment portion is made to flow into an inner pipe through a waste chemical portion, concurrently with making a second waste liquid discharged from the water treatment portion flow through a waste water portion into an outer pipe which is disposed outside the inner pipe; and the second waste liquid has a lower temperature than the first waste liquid.

12 Claims, 8 Drawing Sheets

TREATMENT METHOD OF WASTE LIQUID AND TREATMENT APPARATUS

BACKGROUND OF THE INVENTION

1. Field of the Invention

The present invention relates to a treatment method of a waste liquid which is generated from a manufacturing apparatus typified by a manufacturing apparatus for a semiconductor device, and a treatment apparatus.

2. Description of the Related Art

In a manufacturing process of a semiconductor device such as a thin film transistor (TFT), for example, a waste liquid generated from a manufacturing apparatus needs to be treated. A manufacturing plant daily produces a great amount of waste liquids, and a treatment method thereof largely affects running cost of the plant. Reference 1 proposes a substrate treatment system of a development apparatus, in which waste liquids such as a developing solution and washing water generated from the apparatus, are treated in different pipes in different systems (Reference 1: Japanese Patent Application Laid-Open No. 2003-229356). In addition, there is a case in which waste liquids generated from an apparatus are flowed to different pipes in different systems by using a switch valve so as to treat the waste liquids (for example, Reference 2: Japanese Patent Application Laid-Open No. H7-78799).

In terms of safety, there is a case of treating a waste liquid with pipes doubled (for example, Reference 3: Japanese Patent Application Laid-Open No. 2000-88148). Reference 3 proposes a double pipe system in which an outer pipe is laid in the periphery of a main pipe. In this case, a waste liquid flows only in the main pipe which is provided inside, and the outer pipe which is provided outside has a cavity. The outer pipe is provided for avoiding danger due to leakage from the main pipe.

There is a case where a waste liquid needs to be cooled to the temperature which a waste liquid collect tank can accept, since the waste liquid has a high temperature by a manufacturing process. In this case, a measure of making a pipe longer than necessary for naturally cooling a waste liquid, additionally providing a cooling mechanism on a manufacturing apparatus for cooling a waste liquid, or the like has been required. In Reference 4, a precooling tank having a cooling coil for cooling a waste liquid is additionally provided on an apparatus (Reference 4: Japanese Patent Application Laid-Open No. H6-132272).

SUMMARY OF THE INVENTION

As described above, in treating a waste liquid having a high temperature, extra capital investment has been required for lengthening a pipe more than necessary, additionally providing a cooling mechanism, or the like. Further, there has been a problem of increase in size of equipment. For the case of treating a harmful waste liquid, a method of using a double pipe for securing safety has been proposed. However, since the outer pipe has a cavity, which constitute wasted space, cost is increased and the miniaturization of the equipment is avoided. Additionally providing a cooling mechanism or using a double pipe increase cost and equipment in size.

Accordingly, in treating a waste liquid, it is an object of the present invention to safely treat the waste liquid without increasing cost and without providing large equipment.

One feature of a treatment method of a waste liquid of the present invention is that, when a first waste liquid is made to flow through an inner pipe of a double pipe in which the inner pipe is provided inside an outer pipe, a second waste liquid having a lower temperature than the first waste liquid is made to flow between an outer wall of the inner pipe and an inner wall of the outer pipe.

One feature of a treatment method of a waste liquid of the present invention is to include the steps of supplying a first treatment liquid to a first treatment portion from a first treatment liquid supply portion; supplying a second treatment liquid to a second treatment portion from a second treatment liquid supply portion; flowing a first waste liquid discharged from the first treatment portion through a first waste liquid portion to an inner pipe provided at an inside of a double pipe; and flowing a second waste liquid discharged from the second treatment portion through a second waste liquid portion to a portion between an outer wall of the inner pipe of the double pipe and an inner wall of an outer pipe.

One feature of a treatment method of a waste liquid of the present invention is to include the steps of supplying a first treatment liquid to a first treatment portion from a first treatment liquid supply portion and a second treatment liquid to a second treatment portion from a second treatment liquid supply portion; flowing a first waste liquid discharged from the first treatment portion through a first waste liquid portion to an inner pipe provided at an inside of a double pipe; and flowing a second waste liquid discharged from the second treatment portion through a second waste liquid portion to a portion between an outer wall of the inner pipe of the double pipe and an inner wall of an outer pipe, in which the second waste liquid has a lower temperature than the first waste liquid at the start of discharging from the second treatment portion, and the second waste liquid contains the first treatment liquid which is diluted with a solvent contained in the second treatment liquid.

One feature of a treatment method of a waste liquid of the present invention is that the first waste liquid is made to flow into the inner pipe by using a first switch valve, the second waste liquid is made to flow between the outer wall of the inner pipe and the inner wall of the outer pipe by using a second switch valve, and the first waste liquid is once stored by using a valve provided in the inner pipe.

One feature of a treatment method of a waste liquid of the present invention is that the first waste liquid is made to flow into the inner pipe by using a first switch valve, the second waste liquid is made to flow between the outer wall of the inner pipe and the inner wall of the outer pipe by using a second switch valve, and the second waste liquid is once stored by using a valve provided between the outer wall of the inner pipe and the inner wall of the outer pipe.

One feature of a treatment method of a waste liquid of the present invention is that the first waste liquid is made to flow into the inner pipe by using a first switch valve, the second waste liquid is made to flow between the outer wall of the inner pipe and the inner wall of the outer pipe by using a second switch valve, the first waste liquid is once stored by using a first valve provided in the inner pipe, and the second waste liquid is once stored by using a second valve provided between the outer wall of the inner pipe and the inner wall of the outer pipe.

One feature of a treatment method of a waste liquid of the present invention is that the first treatment liquid is temperature-controlled in the first treatment liquid supply portion.

One feature of a treatment method of a waste liquid of the present invention is that a concentration of the first treatment liquid contained in the second waste liquid is inspected by a concentration sensor provided on the inner wall of the outer pipe or the outer wall of the inner pipe.

One feature of a treatment apparatus of the present invention is to include a first treatment portion; a second treatment portion; a first treatment liquid supply portion which supplies a first treatment liquid to the first treatment portion; a second treatment liquid supply portion which supplies a second treatment liquid to the second treatment portion; a first waste liquid portion which treats a first waste liquid discharged from the first treatment portion; a second waste liquid portion which treats a second waste liquid discharged from the second treatment portion; and a double pipe including an inner pipe which is connected to the first waste liquid portion and through which the first waste liquid flows and an outer pipe which is connected to the second waste liquid portion, which is provided outside the inner pipe, and through which the second waste liquid flows.

One feature of a treatment apparatus of the present invention is to include a first treatment portion; a second treatment portion; a first treatment liquid supply portion which supplies a first treatment liquid to the first treatment portion; a second treatment liquid supply portion which supplies a second treatment liquid to the second treatment portion; a first waste liquid portion which treats a first waste liquid discharged from the first treatment portion; a second waste liquid portion which treats a second waste liquid discharged from the second treatment portion; and a double pipe including an inner pipe which is connected to the first waste liquid portion and through which the first waste liquid flows and an outer pipe which is connected to the second waste liquid portion, which is provided outside the inner pipe, and through which the second waste liquid flows, in which the second waste liquid has a lower temperature than the first waste liquid at the start of discharging from the second waste liquid portion and contains the first treatment liquid diluted with a solvent contained in the second treatment liquid.

One feature of a treatment apparatus of the present invention is to include a treatment portion; a first treatment liquid supply portion which supplies a first treatment liquid to the treatment portion; a second treatment liquid supply portion which supplies a second treatment liquid to the treatment portion; and a double pipe including an inner pipe which is connected to the treatment portion and through which a first waste liquid discharged from the treatment portion flows and an outer pipe which is connected to the treatment portion, which is provided outside the inner pipe, and through which the second waste liquid flows.

One feature of a treatment apparatus of the present invention is to include a treatment portion; a first treatment liquid supply portion which supplies a first treatment liquid to the treatment portion; a second treatment liquid supply portion which supplies a second treatment liquid to the treatment portion; and a double pipe including an inner pipe which is connected to the treatment portion and through which a first waste liquid discharged from the treatment portion flows and an outer pipe which is connected to the treatment portion, which is provided outside the inner pipe, and through which the second waste liquid discharged from the treatment portion flows, in which the second waste liquid has a lower temperature than the first waste liquid at the start of discharging from the second waste liquid portion and contains the first treatment liquid diluted with a solvent contained in the second treatment liquid.

One feature of a treatment apparatus of the present invention is that a first switch valve and a second switch valve are provided between the treatment portion and the double pipe and at least one of the outer pipe and the inner pipe of the double pipe has a valve.

One feature of a treatment apparatus of the present invention is that the first treatment liquid supply portion includes a temperature control portion.

One feature of a treatment apparatus of the present invention is that an inner wall of the outer pipe or an outer wall of the inner pipe is provided with a concentration sensor.

In the present invention, by making a waste liquid having a lower temperature than a waste liquid flowing through an inner pipe flow through an outer pipe, the waste liquid flowing through the inner pipe can be cooled. In addition, with the double-pipe structure, danger such as leakage of a hazardous chemical can be reduced.

Further in the present invention, a waste water, which is conventionally treated without being reused, is reutilized as a cooling medium, which can reduce cost for cooling. Further, since a cooling mechanism for reutilizing a waste water does not need to be newly provided, waste chemical having a high temperature can be efficiently and safely collected and treated without increasing cost. In addition, by cooling a waste liquid flowing through an inner pipe by making the waste water flow through the outer pipe of the double pipe, the need for wastefully lengthening a pipe for cooling is eliminated.

BRIEF DESCRIPTION OF DRAWINGS

In the accompanying drawings.

DETAILED DESCRIPTION OF THE INVENTION

Embodiment modes of the present invention will be described with reference to the drawings. Note that it is easily understood by those skilled in the art that the invention is not limited to the following descriptions, and various changes may be made in forms and details without departing from the spirit and the scope of the invention. Therefore, the invention should not be limited to descriptions of the embodiment modes below. The same reference numerals are commonly given to the same components or components having the same function in the drawings, and the detailed explanation thereof is omitted. Embodiment Modes 1 to 4 can be freely combined with each other.

Embodiment Mode 1

Embodiment Mode 1 will describe a treatment method of a waste liquid and a treatment apparatus in which a waste liquid having a lower temperature than a waste liquid flowing through an inner pipe is made to flow through an outer pipe, with reference to FIGS. 1 to 4B.

Figure 1:
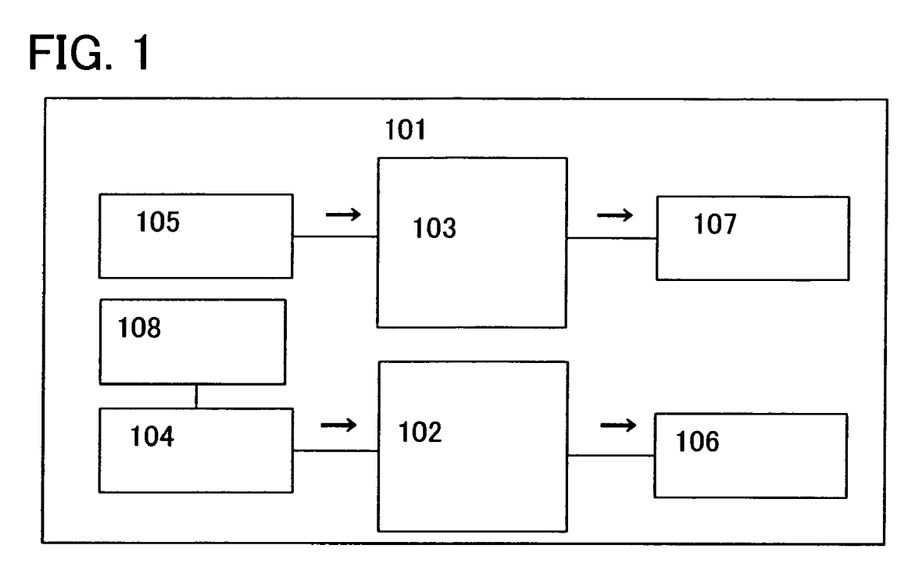
FIG. 1 shows a treatment method of a waste liquid of the present invention.

FIG. 1 shows a treatment apparatus 101. The treatment apparatus 101 includes a chemical liquid supply portion 104 which supplies a chemical liquid to a chemical liquid treatment portion 102 which performs treatment with the chemical liquid, a waste chemical portion 106 which treats a waste liquid discharged from the chemical liquid treatment portion 102, a water supply portion 105 which supplies water to a water treatment portion 103 which performs treatment with the water, and a waste water portion 107 which treats a waste liquid discharged from the water treatment portion 103. Further, the treatment apparatus 101 includes a double pipe (not shown) into which the waste liquid discharged from the chemical liquid treatment portion 102 and the waste liquid discharged from the water treatment portion 103 flow. Note that the structure of the treatment apparatus 101 is not limited to the one shown in FIG. 1 and may include a plurality of chemical liquid treatment portions or a plurality of water treatment portions.

In this embodiment mode, in the chemical liquid treatment portion 102, treatment such as wet etching, development, or stripping (peeling) for example, is conducted. Accordingly, the waste liquid discharged from the chemical liquid treatment portion 102 contains a chemical liquid.

In this embodiment mode, in the water treatment portion 103, treatment such as washing of a substrate which has been treated in the chemical liquid treatment portion 102 for example, is conducted. In this case, the waste liquid discharged from the water treatment portion 103 contains a chemical liquid at a lower concentration than that of the waste liquid discharged from the chemical liquid treatment portion 102. Washing of the substrate before being treated in the chemical liquid treatment portion 102, or the like may be conducted in the water treatment portion 103, and in that case, foul water which does not contain a chemical liquid is discharged from the water treatment portion 103, as a waste liquid.

In this embodiment, the temperature of the waste liquid discharged from the water treatment portion 103 has to be lower than that of the waste liquid discharged from the chemical liquid treatment portion 102. As the water supplied from the water supply portion 105 to the water treatment portion 103, tap water or distilled water (i.e. pure water) which is made by removing suspended substances and impurities, can be used. In the case of a manufacturing apparatus of a semiconductor device, pure water is preferably used.

A temperature control portion 108 for controlling the temperature of the chemical liquid is provided on the chemical liquid supply portion 104 (FIG. 1). In this embodiment mode, the description is made of the case where a chemical liquid which is controlled in advance to have a high temperature by the temperature control portion 108, is supplied to the chemical liquid treatment portion 102 and a waste liquid discharged from the chemical liquid treatment portion 102 is treated; however, the temperature control portion 108 need not necessarily be provided. The present invention can be applied to the case where reaction with heat generation is caused in the chemical liquid treatment portion 102 and a waste liquid which accordingly has a high temperature is treated. In other words, the present invention can be carried out as long as the temperature of the waste liquid discharged from the chemical liquid treatment portion 102 is higher than that of the waste liquid discharged from the water treatment portion 103.

Figure 2A:
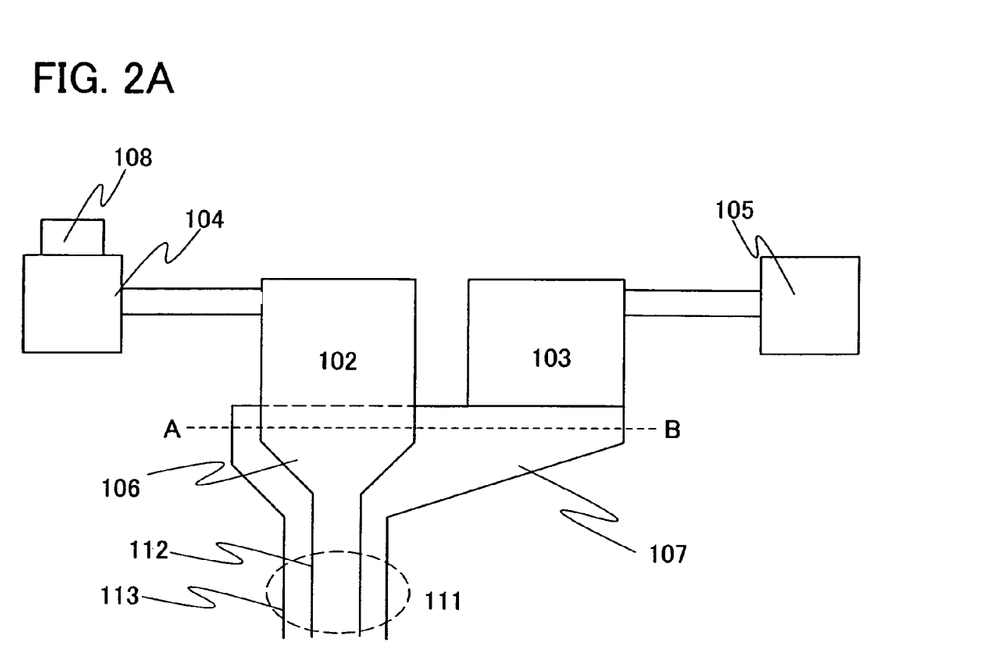
FIGS. 2A and 2B show a treatment method of a waste liquid of the present invention.
Figure 2B:
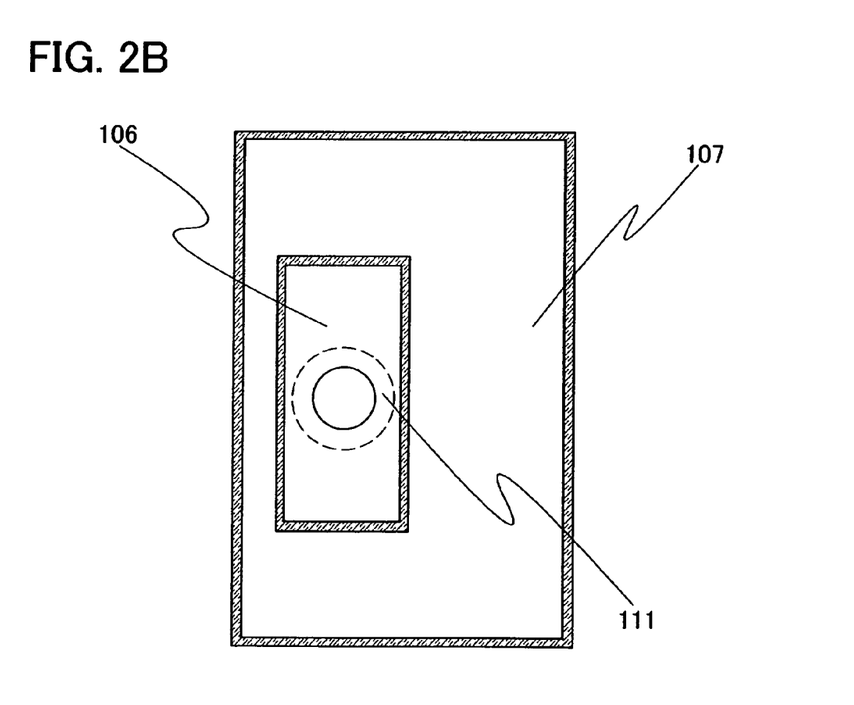

As such a treatment apparatus 101, an apparatus shown in FIG. 2A can be employed. FIG. 2B is an exemplary diagram of a section of a portion shown by a dotted line A-B in FIG. 2A. In this embodiment mode, the waste chemical portion 106 is provided inside the waste water portion 107. Due to this, a double pipe 111 in which an inner pipe 112 extending from a drain of the waste chemical portion 106 is covered with an outer pipe 113 extending from a drain of the waste water portion 107, is formed (FIGS. 2A and 2B). That is, the inner pipe 112 is provided inside the outer pipe 113.

In this embodiment mode, the chemical liquid which is controlled to have a high temperature by the temperature control portion 108, is supplied from the chemical liquid supply portion 104 to the chemical liquid treatment portion 102, and treatment is conducted in the chemical liquid treatment portion 102. Then, water supplied from the water supply portion 105 is used to conduct treatment in the water treatment portion 103. Alternatively, treatment may be conducted in the water treatment portion 103 and then treatment may be conducted in the chemical liquid treatment portion 102. The order of the treatments can be changed as appropriate in accordance with the object.

Next, the waste liquid discharged from the chemical liquid treatment portion 102 and the waste liquid discharged from the water treatment portion 103 concurrently flow into the double pipe 111 through the waste chemical portion 106 and the waste water portion 107, respectively. In other words, the waste liquid discharged from the chemical liquid treatment portion 102 flows into the inner pipe 112, and the waste liquid discharged from the water treatment portion 103 flows into the outer pipe 113, which is a space between an inner wall of the outer pipe 113 and an outer wall of the inner pipe 112. In this embodiment mode, the temperature of the waste liquid flowing through the outer pipe 113 is lower than that of the waste liquid flowing through the inner pipe 112 when discharging of the waste liquid from the water treatment portion 103 starts. Accordingly, the waste liquid flowing through the inner pipe 112 is cooled by the waste liquid flowing through the outer pipe 113.

Figure 3:
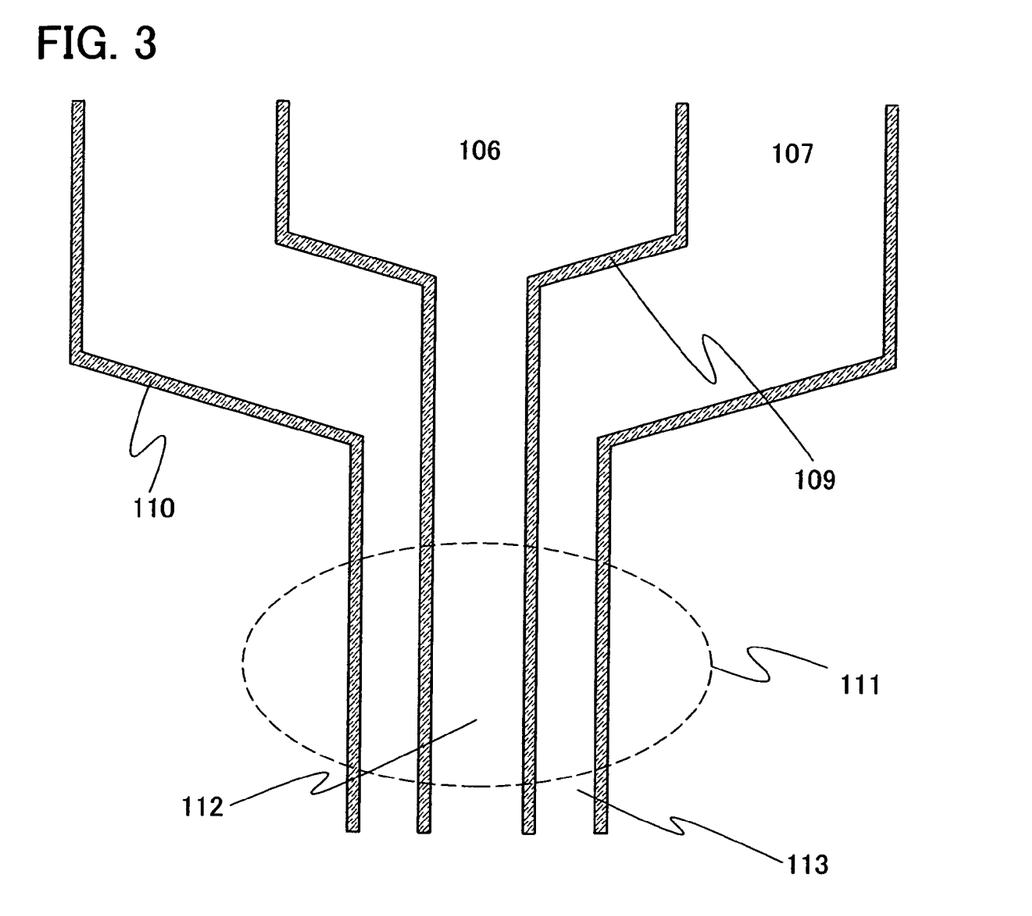
FIG. 3 shows a treatment method of a waste liquid of the present invention.

FIG. 3 is an exemplary diagram of sections of the waste chemical portion 106, the waste water portion 107, the inner pipe 112, and the outer pipe 113 which are shown in FIG. 2A. As shown in FIG. 3, the waste chemical portion 106 and the waste water portion 107 include a waste chemical drain pan 109 having a slope and a waste water drain pan 110 having a slope respectively. Here, a drain pan refers to a sloped plate, which guides the waste liquid discharged from the individual treatment portion into the inner pipe or the outer pipe, and is provided for smoothly flowing the waste liquids into pipes. Alternatively, the treatment portions may be directly connected to the double pipe 111 without providing drain pans.

Figure 4A:
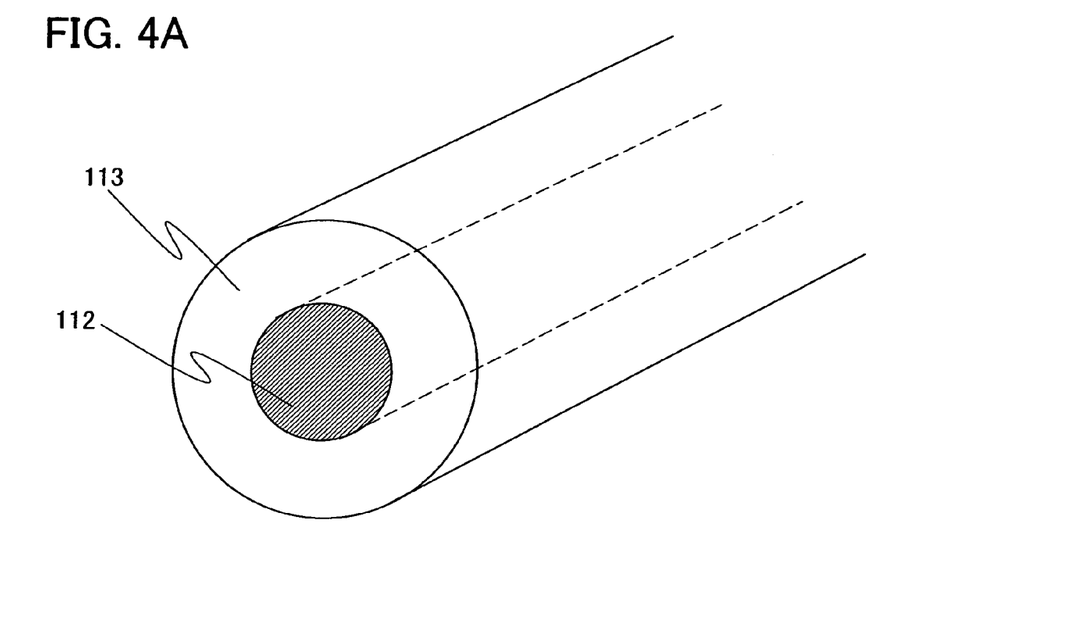
FIGS. 4A and 4B are sectional views showing double-pipe structures of the present invention.
Figure 4B:
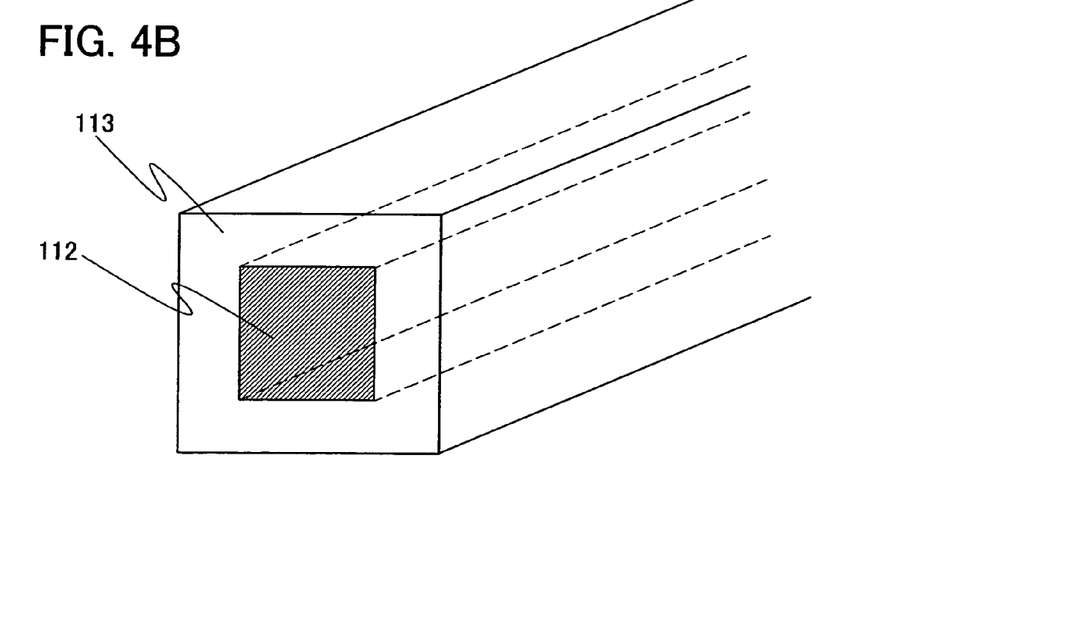

As for shapes of the inner pipe 112 and the outer pipe 113 of the double pipe 111, the section of the pipes may have a circular shape as shown in FIG. 4A, or a polygonal shape as shown in FIG. 4B. The section of the pipes has a circular shape in FIG. 4A; however, it may have an elliptical shape. In addition, the section of the pipes is a quadrangular shape in FIG. 4B; however, it is not limited to the quadrangle and may have a polygon such as a triangle or a pentagon.

By making the waste liquid having a lower temperature than the waste liquid flowing through the inner pipe 112 flow through the outer pipe 113, the waste liquid flowing through the inner pipe 112 can be cooled. In addition, with the double-pipe structure, danger such as leakage of a hazardous chemical can be reduced.

Further, a waste water, which is conventionally treated without being reused, is reutilized as a cooling medium, which can reduce cost for cooling. Further, since a cooling mechanism for reutilizing a waste water need not be newly provided, waste chemical having a high temperature can be efficiently and safely collected and treated without increasing cost. In addition, by cooling a waste liquid flowing through an inner pipe by making the waste water flow through the outer pipe of the double pipe, the need for wastefully lengthening a pipe for cooling is eliminated.

Embodiment Mode 2

Embodiment Mode 2 describes a case of providing a concentration sensor on an outer pipe, in a treatment apparatus and a treatment method of a waste liquid in which a waste liquid having a lower temperature than that of a waste liquid flowing through an inner pipe is made to flow through the outer pipe.

Figure 5A:
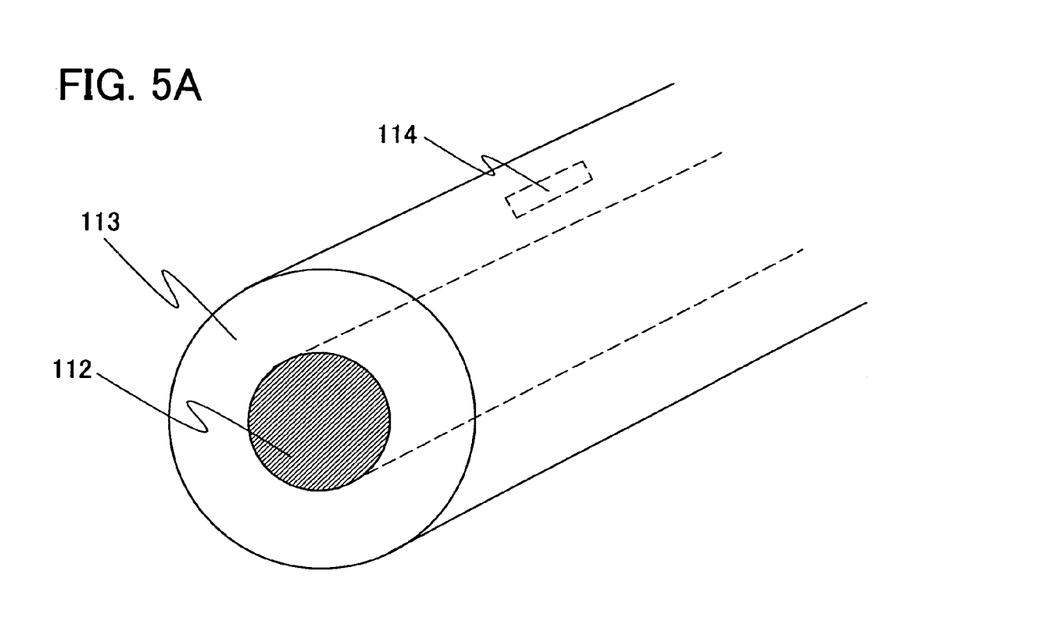
FIGS. 5A and 5B show a treatment method of a waste liquid of the present invention.
Figure 5B:
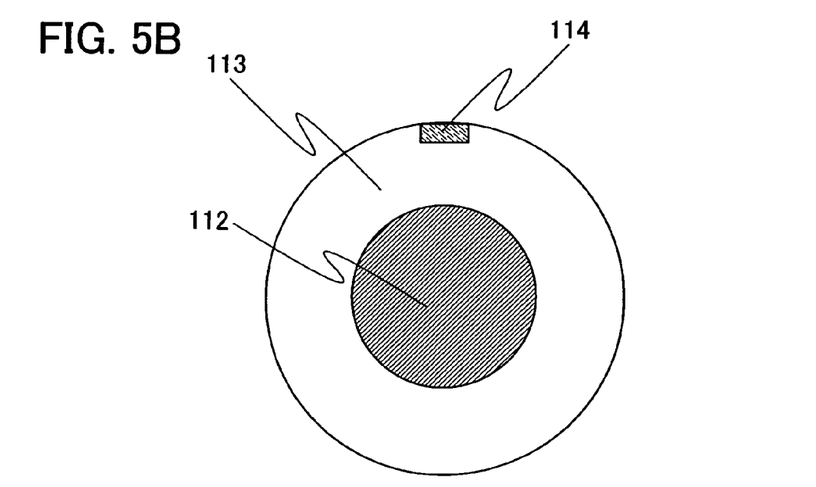

At least one concentration sensor 114 is provided on an inner wall of an outer pipe 113 of a double-pipe structure (FIGS. 5A and 5B). FIG. 5B is a sectional view of FIG. 5A. In a treatment apparatus, the concentration sensor 114 inspects a waste liquid flowing through the outer pipe 113 and observes whether a waste liquid flowing through an inner pipe 112 is mixed in the waste liquid flowing through the outer pipe 113. The concentration sensor 114 is a device which reports warning such as alert in response to a constituent of the waste chemical which flows through the inner pipe 112. The concentration sensor 114 may be provided on an outer wall of the inner pipe 112 or the inner wall of the outer pipe 113 for example, as long as the concentration sensor 114 can observe the concentration of the waste liquid flowing through the outer pipe 113. The concentration sensor 114 needs to be fixed so as not to be flowed by the waste liquid.

As for the concentration value to which the concentration sensor 114 responds, a reference concentration value is determined in consideration of the possible amount of interfusion during a process treatment. When the concentration of a chemical contained in the waste liquid flowing through the inner pipe 112, which is equal to or more than the reference concentration value, is detected in the waste liquid flowing through the outer pipe 113, it is judged that leakage of the waste chemical from the inner pipe 112 is generated and warning such as alert is reported.

In the case of the double-pipe structure, since leakage from the inner pipe cannot be observed from outside, the response is likely to be late. However, by providing a concentration sensor as in this embodiment mode, the leakage can be detected early. In addition, in a double-pipe structure of the present invention, since a liquid also flows through the outer pipe, leakage of the whole pipes can be observed by providing only one concentration sensor for liquid phase on a lower part of the outer pipe.

Note that this embodiment mode can be freely combined with other embodiment modes.

Embodiment Mode 3

Embodiment 3 will describe a batch type treatment apparatus with reference to drawings.

Figure 6A:
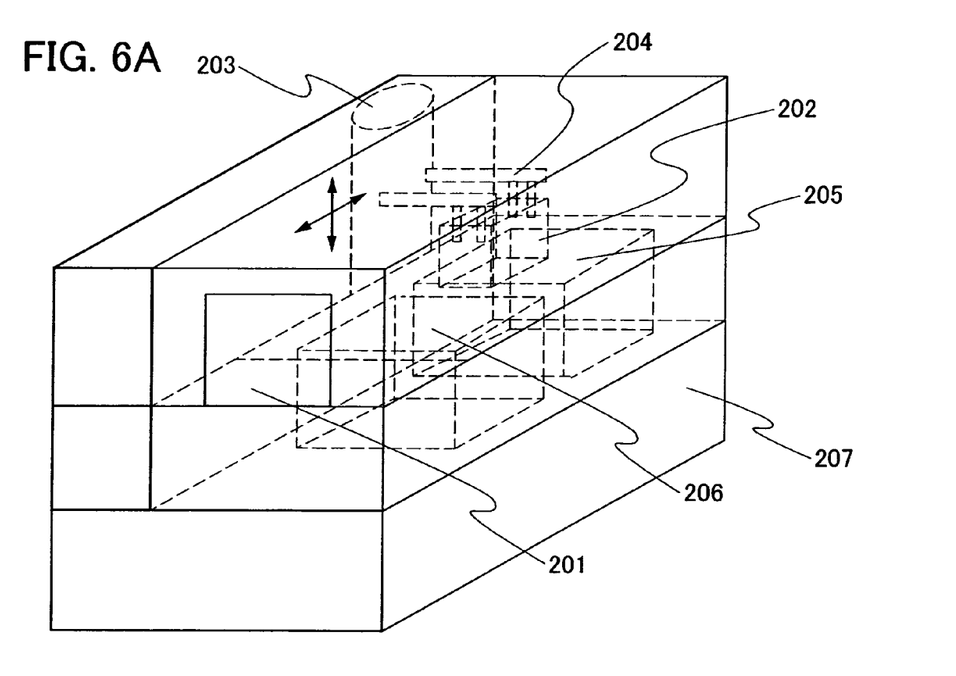
FIGS. 6A and 6B show a treatment apparatus which can carry out a treatment method of a waste liquid of the present invention.
Figure 6B:
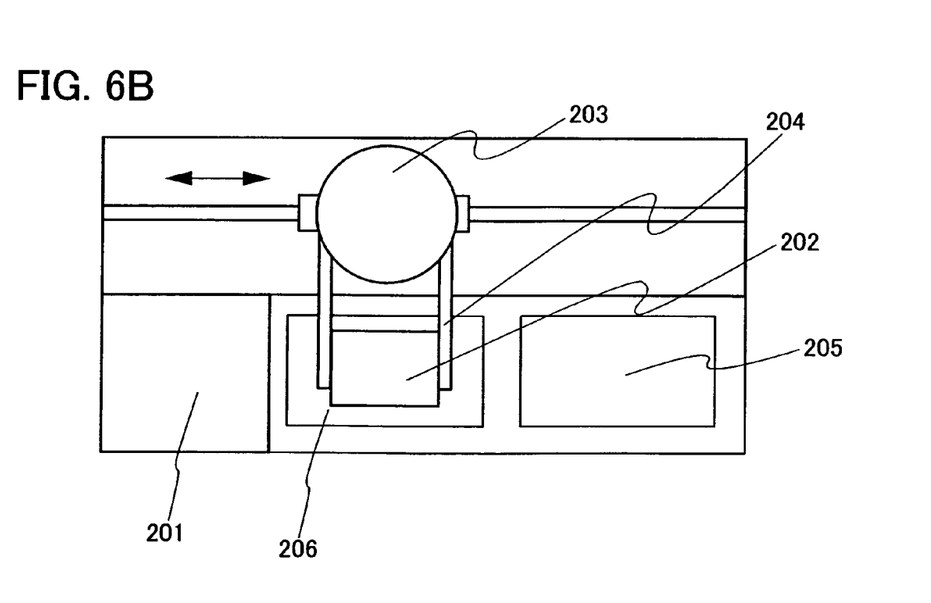

FIGS. 6A and 6B show the structure of the batch type treatment apparatus which can carry out a treatment method of a waste liquid of the present invention. FIG. 6B is an exemplary diagram of a top view of FIG. 6A.

The batch type treatment apparatus includes a workstation 201, a chemical liquid treatment tank 205, a water treatment tank 206, a robot 203 including an arm chuck 204, and a waste liquid treatment portion 207. The arm chuck 204 is controlled by the robot 203.

First, a treatment subject 202 is transferred to the workstation 201 and is transferred to the chemical liquid treatment tank 205 by using the arm chuck 204. Then, in the chemical liquid treatment tank 205, treatment to the treatment subject 202 is performed by using a chemical liquid. For example, in the case of a wet etching apparatus, etching treatment of the treatment subject 202 is performed with fluorinated acid, oxalic acid, or the like in the chemical liquid treatment tank 205. In a stripping (peeling) apparatus, the chemical liquid treatment tank 205 has, for example, two chemical liquid treatment tanks of a stripping (peeling) solution tank and an isopropyl alcohol (IPA) tank, and in each of the chemical liquid treatment tanks, stripping (peeling) treatment of the treatment subject 202 is performed.

Next, the treatment subject 202 is transferred to the water treatment tank 206 by the arm chuck 204. In the water treatment tank 206, the treatment subject 202 which has been treated in the chemical liquid treatment tank 205 is subjected to treatment such as washing.

A certain amount of a chemical liquid whose temperature is controlled, is always supplied to the chemical liquid treatment tank 205, and the chemical liquid always overflows. When the treatment subject 202 is transferred, the chemical liquid with the amount of the volume of the treatment subject 202 further overflows. A certain amount of water is always supplied to the water treatment tank 206, and the water always overflows. When the treatment subject 202 is transferred, the water with the amount of the volume of the treatment subject 202 further overflows.

The waste chemical which overflows the chemical liquid treatment tank 205 and the waste water which overflows the water treatment tank 206 flow into the waste liquid treatment portion 207. The waste liquid treatment portion 207 has, similarly to FIG. 2A, a waste chemical portion and a waste water portion. Similarly to Embodiment Mode 1, the waste chemical which overflows the chemical liquid treatment tank 205 passes through the waste chemical portion and flows into an inner pipe of a double pipe, while the waste water which overflows the water treatment tank 206 passes through the waste water portion and flows into an outer pipe of the double pipe.

In this embodiment mode, the waste liquid having a lower temperature than the waste liquid flowing through the inner pipe flows through the outer pipe. Accordingly, the waste liquid flowing through the inner pipe can be cooled by the waste liquid flowing through the outer pipe. In addition, due to the double-pipe structure, danger such as leakage of a hazardous chemical can be reduced.

Further, a waste water, which is conventionally treated without being reused, is reutilized as a cooling medium, which can reduce cost for cooling. Further, since a cooling mechanism for reutilizing a waste water need not be newly provided, waste chemical having a high temperature can be efficiently and safely collected and treated without increasing cost. In addition, by cooling a waste liquid flowing through an inner pipe by making the waste water flow through the outer pipe of the double pipe, the need for wastefully lengthening a pipe for cooling is eliminated.

Embodiment Mode 4

Embodiment 4 will describe a single wafer apparatus with reference to drawings.

Figure 7:
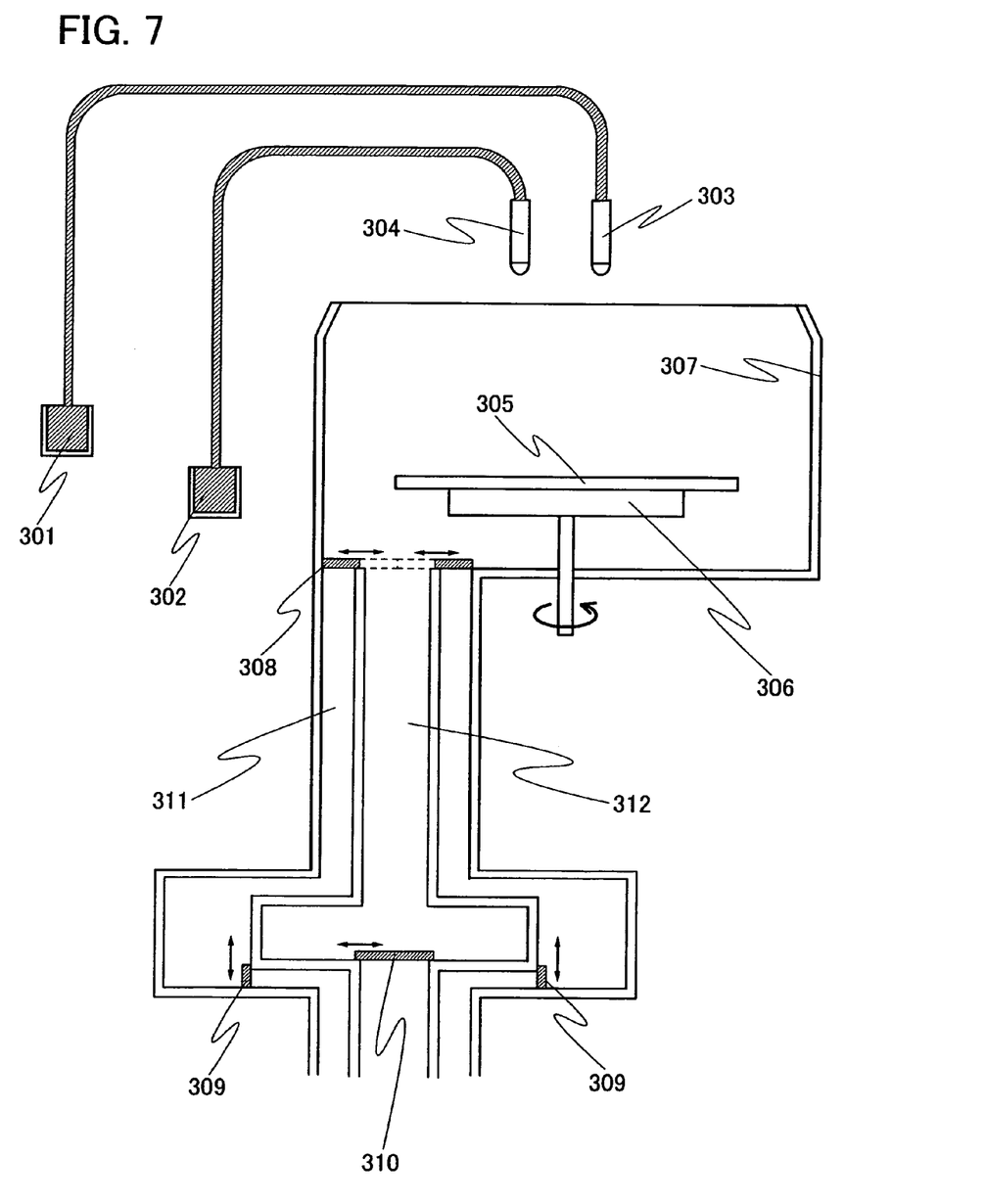
FIG. 7 shows a treatment apparatus which can carry out a treatment method of a waste liquid of the present invention.

FIG. 7 shows a structure of a spin coater apparatus as one example of single wafer apparatuses, which utilize a treatment method of a waste liquid of the present invention.

A spin coater apparatus of this embodiment mode is provided with a water supply portion 301 and a chemical liquid supply portion 302 being provided with a water discharge nozzle 303 for discharging water and a chemical liquid discharge nozzle 304 for discharging a chemical liquid, respectively. The chemical liquid supply portion 302 may have a temperature control function for controlling the temperature of the chemical liquid.

First, a treatment subject 305 is positioned on a rotating stage 306 which is provided in a cup (also referred to as a treatment portion) 307. In this embodiment mode, the cup 307 corresponds to a chemical liquid treatment portion and a water treatment portion. Next, a chemical liquid discharged from the chemical liquid discharge nozzle 304 is applied over the treatment subject 305, while the treatment subject 305 positioned on the rotating stage 306 is rotated at an optimum rotation speed. Then, after the application over the treatment subject, a waste chemical generated in this step flows into an inner pipe 312.

Next, the treatment subject 305 is washed by using water discharged from the water discharge nozzle 303. Then, a waste water generated by the washing treatment flows into outer pipes 311.

In this embodiment mode, treatments for the chemical liquid and water are both conducted in the cup 307 unlike the above-described embodiment modes. Accordingly, a switch valve 308 is provided for separately flowing a waste chemical into the inner pipe 312 of a double pipe and a waste water into the outer pipes 311 of the double pipe.

Figure 8A:
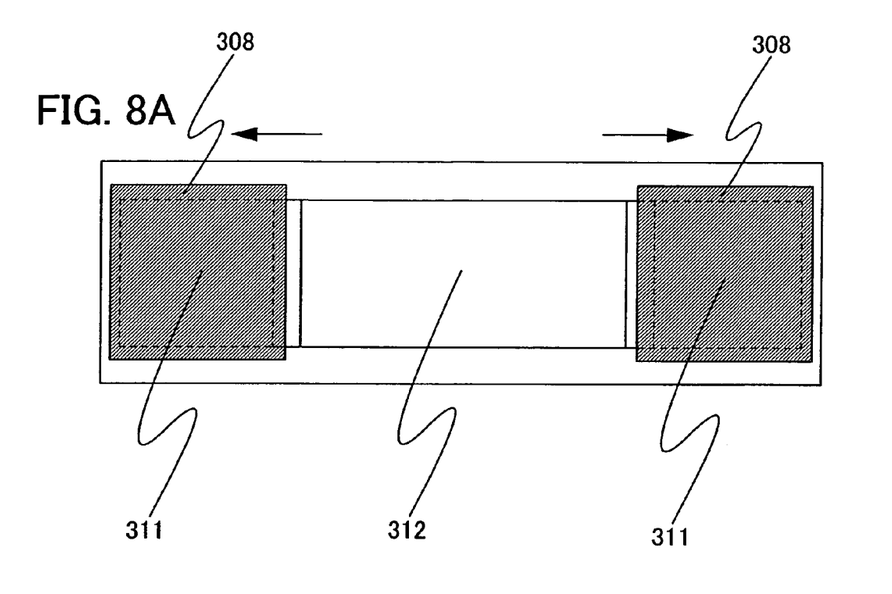
FIGS. 8A and 8B show a treatment apparatus which can carry out a treatment method of a waste liquid of the present invention.
Figure 8B:
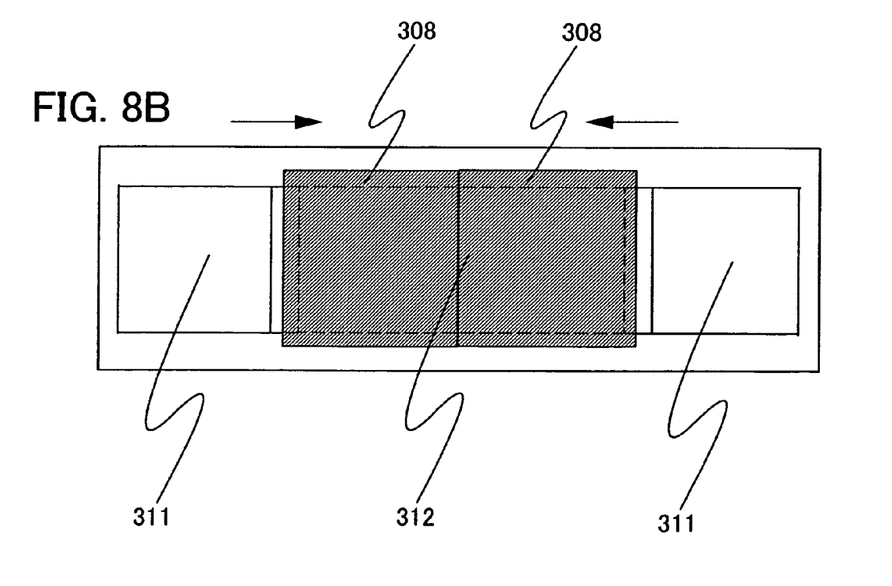

FIGS. 8A and 8B are exemplary diagrams showing a top view of the switch valve of FIG. 7. In the case where the chemical liquid is discharged from the chemical liquid discharge nozzle 304 and the waste chemical is then made to flow into the inner pipe 312, the switch valve 308 is shifted to the outer side so that entries of the outer pipes 311 are closed and an entry of the inner pipe 312 is opened, as shown in FIG. 8A. In the case where water is discharged from the water discharge nozzle 303 and the waste water is then made to flow into the outer pipes 311, the switch valve 308 is shifted to the inner side so that the entry of the inner pipe 312 is closed and the entries of the outer pipes 311 are opened, as shown in FIG. 8B. Accordingly, the waste chemical flows into the inner pipe 312 and the waste water flows into the outer pipes 311.

In this embodiment mode, the waste chemical and the waste water each flow into a double pipe in different timings, unlike the above-described embodiments. Thus, while the waste chemical passes the inner pipe, the waste water may not pass the outer pipe, or vice versa. Accordingly, there is a possibility that the waste chemical cannot be cooled. In order to solve this problem, the spin coater apparatus of this embodiment mode is provided with, as shown in FIG. 7, an outer pipe tank valves 309 at an inside of the outer pipes 311, and an inner pipe tank valve 310 at an inside of the inner pipe 312.

In this embodiment mode, when the chemical liquid is discharged from the chemical liquid discharge nozzle 304, the switch valve 308 shifts to the outer side to flow the waste chemical into the inner pipe 312. Then, the inner pipe tank valve 310 closes, and the waste chemical is stored temporary. When water is discharged from the water discharge nozzle 303, the switch valve 308 shifts to the inside to flow the waste water into the outer pipes 311. Then, the outer pipe tank valves 309 close, and the waste water is stored temporary. Then, the outer pipe tank valves 309 and the inner pipe tank valve 310 are opened concurrently to treat the waste liquids. Using the outer pipe tank valves 309 and the inner pipe tank valve 310, the waste chemical and the waste water can be efficiently cooled.

It is not necessary to provide both of the outer pipe tank valves 309 and the inner pipe tank valve 310, and either one of them may be provided. In such a case, the structure is made such that the waste liquid is stored in an end portion of the pipe which is provided with a tank valve. For example, in the case of providing only the outer pipe tank valves 309, the waste water generated from the water discharge nozzle 303 is stored in the outer pipes 311, and the outer pipe tank valves 309 are opened at the timing when the waste chemical discharged from the chemical discharge nozzle 304 flows into the inner pipe 312. In the case of providing only the inner pipe tank valve 310, the waste chemical discharged from the chemical liquid discharge nozzle 304 is stored in the inner pipe 312, and the inner pipe tank valve 310 is opened at the timing when the waste water generated from the water discharge nozzle 303 flows into the outer pipe 311. Alternatively, both of the outer pipe tank valves 309 and the inner pipe tank valve 310 may be provided and only one of the tank valves may be used.

In this embodiment mode, a waste liquid having a lower temperature than a waste liquid flowing through the inner pipe, flows through the outer pipe. Accordingly, the waste liquid flowing through the inner pipe can be cooled by the waste liquid flowing through the outer pipe. In addition, with the double-pipe structure, danger such as leakage of a hazardous chemical can be reduced.

Further, a waste water, which is conventionally treated without being reused, is reutilized as a cooling medium, which can reduce cost for cooling. Further, since a cooling mechanism for reutilizing a waste water need not be newly provided, a waste chemical having a high temperature can be efficiently and safely collected and treated without increasing cost. In addition, by cooling a waste liquid flowing through an inner pipe by making the waste water flow through the outer pipe of the double pipe, the need for wastefully lengthening a pipe for cooling is eliminated.

This application is based on Japanese Patent Application serial no. 2005-281869 filed in Japan Patent Office on Sep. 28, 2005, the entire contents of which are hereby incorporated by reference.

What is claimed is:

1. A treatment method of a waste liquid, comprising:
   supplying a first treatment liquid to a first treatment portion from a first treatment liquid supply portion;
   supplying a second treatment liquid to a second treatment portion from a second treatment liquid supply portion;
   flowing a first waste liquid discharged from the first treatment portion through a first waste liquid portion to an inner pipe provided at an inside of a double pipe; and
   flowing a second waste liquid discharged from the second treatment portion through a second waste liquid portion to a portion between an outer wall of the inner pipe and an inner wall of an outer pipe of the double pipe.

2. A treatment method of a waste liquid according to claim 1, wherein the first waste liquid is made to flow into the inner pipe by using a first switch valve, the second waste liquid is made to flow between the outer wall of the inner pipe and the inner wall of the outer pipe by using a second switch valve, and the first waste liquid is once stored by using a valve provided in the inner pipe.

3. A treatment method of a waste liquid according to claim 1, wherein the first waste liquid is made to flow into the inner pipe by using a first switch valve, the second waste liquid is made to flow between the outer wall of the inner pipe and the inner wall of the outer pipe by using a second switch valve, and the second waste liquid is once stored by using a valve provided between the outer wall of the inner pipe and the inner wall of the outer pipe.

4. A treatment method of a waste liquid according to claim 1, wherein the first waste liquid is made to flow into the inner pipe by using a first switch valve, the second waste liquid is made to flow between the outer wall of the inner pipe and the inner wall of the outer pipe by using a second switch valve, the first waste liquid is once stored by using a first valve provided in the inner pipe, and the second waste liquid is once stored by using a second valve provided between the outer wall of the inner pipe and the inner wall of the outer pipe.

5. A treatment method of a waste liquid according to claim 1, wherein the first treatment liquid is temperature-controlled in the first treatment liquid supply portion.

6. A treatment method of a waste liquid according to claim 1, wherein a concentration of the first treatment liquid contained in the second waste liquid is inspected by a concentration sensor provided on the inner wall of the outer pipe or the outer wall of the inner pipe.

7. A treatment method of a waste liquid, comprising:
supplying a first treatment liquid to a first treatment portion from a first treatment liquid supply portion;
supplying a second treatment liquid to a second treatment portion from a second treatment liquid supply portion;
flowing a first waste liquid discharged from the first treatment portion through a first waste liquid portion to an inner pipe included by a double pipe on an inner side of the double pipe; and
flowing a second waste liquid discharged from the second treatment portion through a second waste liquid portion to a portion between an outer wall of the inner pipe and an inner wall of an outer pipe included by the double pipe, wherein
the second waste liquid has a lower temperature than the first waste liquid at a start of discharging from the second treatment portion, and
the second waste liquid contains the first treatment liquid which is diluted with a solvent contained in the second treatment liquid.

8. A treatment method of a waste liquid according to claim 7, wherein the first waste liquid is made to flow into the inner pipe by using a first switch valve, the second waste liquid is made to flow between the outer wall of the inner pipe and the inner wall of the outer pipe by using a second switch valve, and the first waste liquid is once stored by using a valve provided in the inner pipe.

9. A treatment method of a waste liquid according to claim 7, wherein the first waste liquid is made to flow into the inner pipe by using a first switch valve, the second waste liquid is made to flow between the outer wall of the inner pipe and the inner wall of the outer pipe by using a second switch valve, and the second waste liquid is once stored by using a valve provided between the outer wall of the inner pipe and the inner wall of the outer pipe.

10. A treatment method of a waste liquid according to claim 7, wherein the first waste liquid is made to flow into the inner pipe by using a first switch valve, the second waste liquid is made to flow between the outer wall of the inner pipe and the inner wall of the outer pipe by using a second switch valve, the first waste liquid is once stored by using a first valve provided in the inner pipe, and the second waste liquid is once stored by using a second valve provided between the outer wall of the inner pipe and the inner wall of the outer pipe.

11. A treatment method of a waste liquid according to claim 7, wherein the first treatment liquid is temperature-controlled in the first treatment liquid supply portion.

12. A treatment method of a waste liquid according to claim 7, wherein a concentration of the first treatment liquid contained in the second waste liquid is inspected by a concentration sensor provided on the inner wall of the outer pipe or the outer wall of the inner pipe.

* * * * *